July 17, 1934.  M. S. GEREND  1,966,796

METHOD OF AND APPARATUS FOR HEATING AND DEAERATING WATER

Filed Aug. 6, 1931

INVENTOR.
MATTHIAS STEPHEN GEREND.
BY John E. Hubbell
ATTORNEY

Patented July 17, 1934

1,966,796

UNITED STATES PATENT OFFICE 1,966,796

METHOD OF AND APPARATUS FOR HEATING AND DEAERATING WATER

Matthias Stephen Gerend, Berkeley, Calif., assignor to Cochrane Corporation, Philadelphia, Pa., a corporation of Pennsylvania Application August 6, 1931, Serial No. 555,436

10 Claims. (Cl. 183—2.5)

The present invention relates to improvements in apparatus for and methods of heating and deaerating water. More particularly, the invention relates to improvements in the construction and operation of water deaerating heaters in which the water to be treated is first partially heated in a preheater either by steam introduced into a space traversed by water filled tubes or by passing the water into a space traversed by steam filled tubes, and then delivered in regulated quantities into a steam or deaerating space in the heater, passing downwardly therethrough in a divided form and dropping into a water storage space. Steam is admitted to evaporator coils located in the water storage space and being at a higher temperature than the surrounding water, boils the water, and the steam so generated passes upwardly through the steam space of the heater in intimate contact with the descending water. Air and other undesirable gases liberated from the water during its passage through the heater are swept out by the ascending steam into a vent condenser, where the steam is condensed and its heat transferred to water flowing to the preheater. A common source of steam is used for heating the water in the preheater and for the evaporator coils and the steam supply is usually delivered through a main having separate connections to the preheater and evaporator.

Water heating and deaerating apparatus of the general character described above is shown in the pending application of Percy S. Lyon, Serial No. 313,716, filed October 20, 1928 which matured into Patent No. 1,877,412 Sept. 13, 1932.

When the treated water is to be used for hot water service, laundries, process work, or other uses in which a substantially constant temperature of the treated water leaving the heater is essential or desirable, the supply of steam to the different steam utilizing parts of the apparatus must be carefully controlled in order that the desired conditions be maintained. In operating apparatus of the character heretofore described, most of the heating of the water is effected in the vent condenser and preheater, while the evaporator tubes serve only to reboil the water and generate sufficient steam to scavenge the space in which the undesirable gases are separated. Under such conditions, if the supply of steam to the preheater is unduly increased above the amount required to heat the water passing therethrough to the proper temperature, the temperature of the water leaving the preheater will be raised substantially above the proper temperature, and since its pressure is reduced as it passes through a regulating valve at the water inlet to the heater, the water frequently flashes into steam on being introduced into the heater. The excessive vibration of the movable regulating valve parts which is caused by such flashing actions is particularly disadvantageous.

Control of the common steam supply to the preheater and evaporator in accordance with the temperature in the water or vapor space of the heater was also found to be ineffective for the maintenance of the desired water temperature conditions because of the considerable lag present between the apparatus and the control mechanism and the consequent excessive hunting of the controller. Other control methods and mechanisms have been tried, but none of which has been found entirely satisfactory for regulating the steam supplies to the preheater and evaporator so as to automatically and effectively maintain the desired water conditions.

The general object of my present invention is the provision of an improved construction and mode of operation of apparatus for heating and deaerating water. A further and more specific object is the provision of simple and effective mechanism for automatically controlling the supplies of steam to the preheater and evaporator sections of the apparatus in such fashion that its operation maintains a desirable temperature differential between the preheater water outlet and the water in contact with the evaporator heating elements, secures a substantially constant temperature for the water leaving the heater under all loads, eliminates flashing of the water in the course of its treatment, and reduces hunting to a negligible amount.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described preferred embodiments of the invention.

Figure 1:
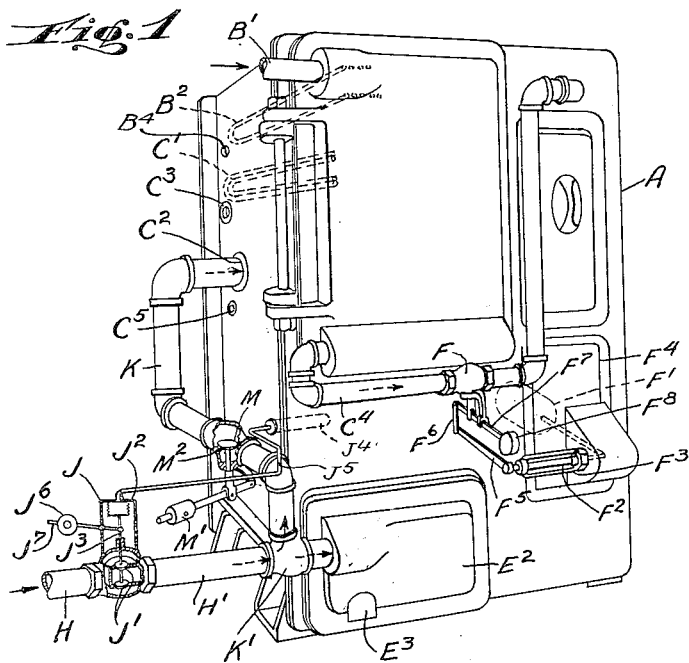
Fig. 1 is a somewhat diagrammatic elevation of a deaerating hot water generator having control mechanism embodying my invention.

The water heating and deaerating apparatus shown in the drawing comprises a heavy metallic shell A of rectangular outline which encloses a vent condenser compartment B, a preheater compartment C, a steam space D and a water storage space E. Water to be treated is delivered through an inlet B' to a bank of tubes B² in the vent condenser and after being heated therein by a mixture of steam, air and other gases being drawn out of the steam space D, passes downwardly into the tubes forming the upper of a plurality of connected rows of preheater tubes C'. The vent condenser and preheater tubes are all advantageously of hairpin or U-shape. The water is circulated rapidly through the serial passes in the preheater compartment and heated during its passage by steam entering through the steam inlet C². The preheater compartment has an atmospheric vent C³ for any steam uncondensed by the water in the tubes C' and a condensate drain C⁵. The heated water flows from the lowermost row of preheater tubes through a pipe C⁴ in which a flow regulating valve F is incorporated to one or more distributing or spray pipes D' in the upper part of the steam space. The water discharged from the pipes D' is broken up in its downward passage by a bank of trays D² and drops from the lowermost tray into the water storage space E of the heater, from which it is withdrawn as needed through the pipe E⁴.

A portion of the water in the storage compartment is evaporated by means of a closed heater formed by rows of steam-filled evaporator tubes E', which are wholly or partly submerged therein. The tubes E' are advantageously of the hairpin type and arranged in inner and outer rows with their ends connected to a head box E² at the front of the heater. A drain E³ allows the condensate from the tubes E' to escape. The steam generated passes upwardly through the steam space of the heater in intimate contact with the descending water and the portion uncondensed by the downflowing water passes through a port B³ into the vent condenser where its heat is recovered by the entering water. The vent condenser chamber is evacuated through a port B⁴ leading to atmosphere or to a vacuum pump or steam ejector (not shown), depending upon the vapor pressure in the heater. The undesirable corrosive gaseous constituents separated out of the water during its passage through the heater steam space are carried out through the vent condenser along with any uncondensed steam.

The control valve F in the water supply pipe C⁴ regulates the amount of water delivered to the heater steam space in accordance with the amount of water present in the water storage space. The mechanism for operating the valve F consists of a control float F' in the water space connected to a spindle F², which is journaled in a bearing F³ formed on an access door F⁴. The spindle is connected by a lever F⁵ and link F⁶ to a valve operating lever F⁷, to which the movable valve parts are connected. A weight F⁸ on the lever F⁷ serves to balance the valve. The valve F is normally partly open and is closed only when the water level in the heater rises above the desired working height.

My present improvements are principally concerned with the provision of improved mechanism for regulating the amount of steam supplied to the steam space of the preheater and to the evaporator tubes. Steam is supplied to the apparatus from a suitable source, such as exhaust steam or steam bled from steam turbines, through a supply main H connected to the head box E² of the evaporator tubes by a pipe H'. The amount of steam drawn from the main H and delivered to the apparatus is regulated by a thermostatic control valve J in the pipe H' which is operated in accordance with the variations in the temperature of the water in the water storage space from a predetermined desired value, as is hereinafter described.

The control valve J may be of any suitable type, and as shown consists of upper and lower valve discs J', vertically movable to control the amount of steam passing to the pipe H', by an expansible tube J² of the well known accordion type. The tube J² is fixed at its upper end, while its lower movable end is connected to the valve members J' by a valve stem J³. A thermostatic bulb J⁴ is positioned in the heater slightly above the normal level of the water in the storage space and connected to the tube J² by tubing J⁵, all of which are filled with a fluid adapted to expand and contract on changes in temperature of the water or steam in contact with the bulb, causing the tube J² to expand and contract and thereby respectively decrease and increase the supply of steam to the apparatus. An adjustable weight J⁶ mounted on a pivoted lever J⁷, the opposite end of which is also pivoted to the valve stem J³, opposes the closing of the valve to a predetermined extent and restores it to its open position when the heater water temperature falls below its desired value. The position of the thermometer bulb J⁴ indicated enables it to quickly respond to changes in temperature and pressure in the heater and considerably reduces the lag in the control mechanism.

The use of a single thermostatic valve mechanism with the described construction has not been found to give the most effective control of the water outlet temperature, primarily because of the tendency of the mechanism to hunt and its inability to accurately control the temperature to which the water is heated in the preheater. In accurate control of the preheater outlet temperature frequently results in an excessive amount of heating of the water therein and flashing when the heated water is introduced into the heater steam space. For example, if the final water temperature in the heater only drops slightly below normal, the valve J will be moved to its wide open position and remain so until the water temperature has been raised to the desired value. During this period, the pressure in the steam space of the preheater substantially increases and the water in the tubes is heated to a temperature considerably above the desired value at which it should be delivered to the trays. After being so heated it passes through the water regulating valve and its lower pressure at the heater side thereof causes the entering water to flash into steam. Even after the valve J is closed by the rise in temperature in the heater, the excessive temperature at the preheater outlet may be maintained for some time due to the heat storage capacity of the preheater steam space.

Flashing in the steam space D can occur only when the temperature of the water coming to that space from the preheater is higher than the temperature of steam at the pressure of the steam in the space D. In accordance with the present invention flashing in the space D is prevented by preferential steam distribution means serving to divide the total amount of steam condensed in the evaporator and in the steam preheater into two portions of which the portion condensed in the evaporator is sufficiently large so that the rate at which steam is generated by the evaporator and passes upward into the steam space D constantly exceeds the rate at which steam in admixture with the liberated air is discharged from the space D into the vent condenser.

In consequence the excess of the steam generated over that discharged is necessarily condensed by and raises the temperature of the water coming from the preheater. Since the portion of the steam condensed in the evaporator performs a water heating function and does part of the work of heating the water to the final delivery temperature thereof, the portion of the steam condensed in the preheater is necessarily insufficient to heat the water in the preheater to a temperature high enough to result in flashing when the water is passed into the space D. The preferential steam distribution means may take various forms, one of which is illustrated in Figs. 1 and 2, and another of which is illustrated in Fig. 3.

Figure 2:
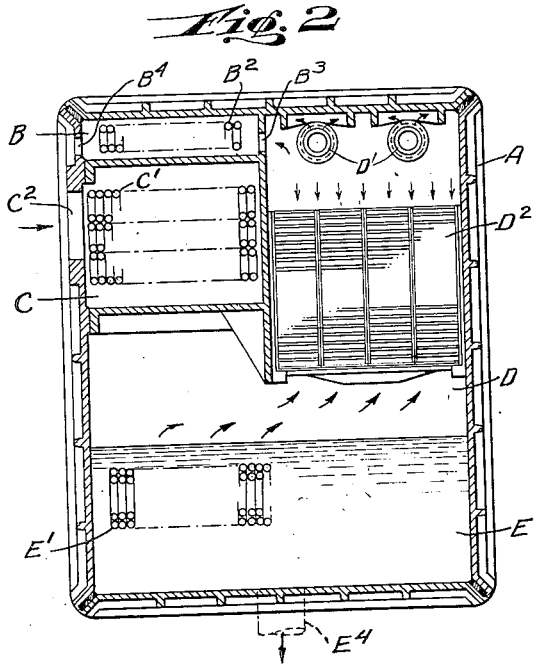
Fig. 2 is a vertical section of a portion of the apparatus shown in Fig. 1.

The arrangement illustrated in Figs. 1 and 2 is especially advantageous for carrying out the foregoing method of operation, and as shown comprises a branch pipe K leading from the steam supply pipe H' at a point between the thermostatic valve J and the heater to the steam space of the preheater. The pipes H' and K are connected by a T K' and a back pressure valve M is incorporated in the pipe K for controlling the supply of steam to the preheater. The valve M is loaded by an adjustable weight M' connected to the valve closure member M². When so arranged, the passage of heating steam into the pipe K is prevented until the rise in pressure in the pipe H' indicates that the amount of steam required to maintain the final water temperature at the desired value is not being wholly condensed in the evaporator tubes. The valve M will then open and permit steam equivalent in amount to the portion not being condensed in the evaporator tubes to pass into the steam space of the preheater. With the arrangement shown in Figs. 1 and 2, the preferential steam distribution means employed is characterized by the provision of the main steam supply pipe with two outlets one opening directly to the evaporator while the other, K, leads to the steam space of the preheater and includes the valve M which restricts the flow of steam through this branch outlet and thereby insures the desired preferential distribution of steam, since the outlet opening to the evaporator is unrestricted.

With the apparatus described, substantially all of the water heating action at relatively light loads will be effected by the steam generated by the evaporator tubes. That mode of operation will continue as long as the required amount of heating to bring the water to the desired final temperature is within the heat transmitting capacity of the evaporator tubes. As the load increases, and the increased amount of heat required exceeds the capacity of the evaporator, steam will pass into the steam space of the preheater in increasing amounts and the proportion of the heating action effected by the preheater will gradually increase. The evaporator tubes in normal operation do not raise the temperature of the water in the heater storage space, but generate steam in amounts sufficient to insure a substantial heating of the water in the vent condenser and heater steam space. The heat transfer capacity of the evaporator tubes is intentionally greater than the heat absorbing capacity of the vent condenser so that some of the steam generated will be condensed by the water descending through the tray bank. The amount of heating effected by the preheater can never be sufficient to give the water leaving the preheater a temperature equal or greater than the temperature of the water in the storage space. No flashing can therefore occur in the apparatus. Under all load conditions, a temperature differential will exist between the evaporator tubes and the preheater water outlet. The normal preheater water outlet temperature is thus reduced to an extent that the heater control provisions operate independently of that temperature.

Figure 3:
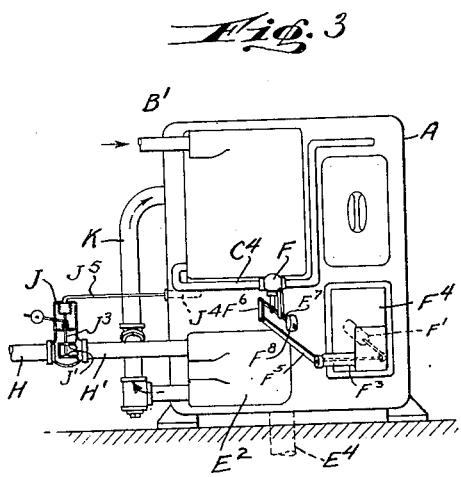
Fig. 3 is a view similar to Fig. 1 of a modification.

In Fig. 3, I have illustrated a modified arrangement embodying the same principles of operation as heretofore described. With the arrangement of Fig. 3, the preferential distribution means is characterized by the fact that the total amount of steam supplied for heating and deaerating the water is passed initially into the evaporator and that the latter has an outlet through which steam not condensed therein is passed to the steam space of the preheater. In this construction, the valve M is eliminated and the steam supply pipe K to the preheater is connected directly to the outlet side of the evaporator head box E². A series flow of heating steam through the evaporator tubes to the preheater steam space is thus provided. The operation is substantially the same as in the construction shown in Figs. 1 and 2, the preheater receiving steam only when the amount of heat required to bring the water to the desired temperature exceeds the heat transferring capacity of the evaporator.

With the construction shown in Fig. 3, as with that shown in Figs. 1 and 2, when less than the full heating capacity of the preheater is required and the supply of steam to the latter is correspondingly reduced, more or less air is held in the steam space of the preheater to effect the necessary reduction in preheater heating capacity without undesirable reduction of the pressure within said space. Similarly in each construction at light loads requiring less than the full heating capacity of the evaporator, the heating capacity of the latter will be reduced by air accumulation in the steam space of the evaporator without objectionable reduction in pressure in the last mentioned space. With each form of the invention illustrated, the difference at any time between the pressure, and consequently the temperature, at which steam is supplied to the evaporator tubes E', and the pressure, and consequently the temperature, at which steam is supplied to the preheater is relatively small and is immaterial and without significance, and is merely incidental to the manner in which the preferential distribution of the steam is effected, and my invention is distinguished in this respect among others from the prior patent of Gibson No. 1,636,361, granted July 19, 1927, wherein the steam is supplied to the preheater K of said patent at a temperature appreciably below that to which the water is heated in the heating chamber containing the evaporator tubes e necessarily supplied with steam at a temperature above that to which the water is heated.

Having now described my invention what I claim as new and desire to secure by Letters Patent, is:

1. In the operation of heating and deaerating water by initially heating the water in a preheater having a heating steam space, passing the water into the vapor space of a chamber separated from said steam space and enclosing an upper vapor space and a lower water storage space, subjecting the water in said chamber to an evaporative action generating steam in said chamber, and discharging from said chamber steam admixed with the air liberated from the water, the method which consists in supplying steam for the heating and deaerating operation as required to insure a desirable water temperature in said storage space, condensing so much of the steam supplied in carrying out the evaporating action as is necessary for the generation of steam in said chamber at a rate in excess of the rate at which steam is discharged from the chamber, condensing the steam so generated and not discharged in heating the water in said chamber, and passing the uncondensed residue of the steam supplied to the steam space of the preheater normally at a temperature in excess of said water temperature.

2. In the operation of heating and deaerating water by initially heating the water in a preheater having a heating steam space, passing the water into the vapor space of a chamber separated from said steam space and enclosing an upper vapor space and a lower water storage space, subjecting the water in said chamber to an evaporative action generating steam in said chamber, and discharging from said chamber steam admixed with the air liberated from the water, the method which consists in supplying steam for the heating and deaerating operation as required to insure an approximately constant water temperature in said storage space, condensing so much of the steam supplied in carrying out the evaporating action as is necessary for the generation of steam in said chamber at a rate in excess of the rate at which steam is discharged from the chamber, condensing the steam so generated and not discharged in heating the water in said chamber and passing the uncondensed residue of the steam supplied to the steam space of the preheater normally at a temperature in excess of said water temperature.

3. In the operation of heating and deaerating water by initially heating the water in a preheater having a heating steam space, passing the water into the vapor space of a chamber separated from said steam space and enclosing an upper vapor space and a lower water storage space, subjecting the water in said chamber to an evaporative action generating steam in said chamber, and discharging from said chamber steam admixed with the air liberated from the water, the method of regulating the supply and distribution of steam supplied to carry out said operation which consists in supplying steam as required to maintain a desirable water temperature in said storage space, dividing the steam so supplied into two portions at the said pressure, passing one of said portions to said steam space, condensing the other portion in carrying out the evaporative action, and restricting the passage to said steam space of said one portion without materially reducing its pressure but so that said other portion produces an evaporative action sufficient for the generation of steam within the chamber at a rate in excess of the rate at which steam is discharged from the chamber, whereby the portion of the steam generated and not withdrawn from said chamber will be condensed therein and will correspondingly increase the temperature of the water entering the chamber.

4. In the operation of heating and deaerating water by initially heating the water in a preheater having a heating steam space, passing the water into the vapor space of a chamber separated from said steam space and enclosing an upper vapor space and a lower water storage space, subjecting the water in said chamber to an evaporative action generating steam in said chamber, and withdrawing from said chamber steam admixed with the air liberated from the water, the method of regulating the supply and distribution of steam supplied to carry out said operation which consists in supplying steam as required to maintain a desirable water temperature in said storage space, rendering all of the steam supplied available for use without reduction in pressure in the evaporative action, and passing the portion of the steam not condensed in said action to said steam space without materially reducing its pressure.

5. Apparatus for heating and deaerating water comprising in combination, a deaerating chamber enclosing an upper vapor space and a lower water storage space, a preheater comprising a heating steam space separated from the first mentioned vapor space, means for passing the water to be treated into the preheater, a connection for passing water from the preheater into the vapor space of said chamber, means for discharging steam in admixture with liberated air from the vapor space of said chamber at a restricted rate, an evaporator in said chamber having a capacity under normal operating conditions for condensing steam supplied thereto as required to evaporate water in said chamber at a rate in the excess of the rate at which steam is discharged by said discharging means, steam supply and distributing means supplying steam for distribution to said evaporator and steam space including means for supplying steam as required to maintain the water in said storage space at a desirable final delivery temperature, and preferential steam distribution means supplying without reduction in pressure for condensation in the evaporator such portion of the steam supplied as the latter is capable of condensing and supplying to said preheater steam space without material reduction in its pressure the portion of the steam supplied and not condensed in said evaporator.

6. Apparatus for heating and deaerating water comprising in combination, a deaerating chamber enclosing an upper vapor space and a storage space, a preheater comprising a heating steam space separate from the first mentioned vapor space, means for passing the water to be treated into the preheater, a connection for passing the water from the preheater into the vapor space of said chamber, means including a valve in said connection for regulating the passage of water through said connection in accordance with the water accumulation in said storage space, means for discharging steam in admixture with liberated air from the vapor space of said chamber at a restricted rate, an evaporator in said water storage space having a capacity under normal operating conditions for condensing steam supplied thereto as required to evaporate water in said chamber at a rate in the excess of the rate at which steam is discharged by said discharging means, steam supply and distributing means supplying steam for distribution to said evaporator and steam space including means for supplying without reduction in pressure steam as required to maintain the water in said storage space at a desirable final delivery temperature, and preferential steam distribution means supplying for evaporation in the evaporator such portion of the steam supplied as the latter is capable of condensing and supplying to the preheater without material reduction in its pressure the portion of the steam supplied and not condensed in the evaporator.

7. Apparatus for heating and deaerating water comprising in combination, a deaerating chamber enclosing an upper vapor space and a lower water storage space, a preheater comprising a heating steam space separated from the first mentioned vapor space, means for passing the water to be treated into the preheater, a connection for passing the water from the preheater into the vapor space of said chamber, means for discharging steam in admixture with liberated air from the vapor space of said chamber, an evaporator in said water storage space having a capacity under normal operating conditions for condensing steam supplied thereto as required to evaporate water in said chamber at a rate in the excess of the rate at which steam is discharged by said discharging means, a steam supply pipe having branched outlets one supplying a portion of the steam passing through said pipe to said evaporator and the other supplying the remainder of the steam passing through said pipe to said preheater and means restricting the flow of steam through the last mentioned outlet without material reduction in its pressure.

8. Apparatus for heating and deaerating water comprising in combination, a deaerating chamber enclosing an upper vapor space and a lower water storage space, a preheater comprising a heating steam space separate from the first mentioned vapor space, means for passing the water to be treated into the preheater, a connection for passing the water from the preheater into the vapor space in said chamber, means for discharging steam in admixture with liberated air from the vapor space of said chamber, an evaporator in said water storage space having a capacity under normal operating conditions for condensing steam supplied thereto as required to evaporate water in said chamber at a rate in the excess of the rate at which steam is discharged by said discharging means, steam supply and distributing means supplying steam for distribution to said evaporator and steam space including a conduit supplying steam as required to maintain the water in said storage space at a desirable final delivery temperature, and two outlets from said conduit one of which leads to the evaporator and the other of which leads to said preheater steam space, said outlets collectively discharging all of the steam passing through said conduit, and a back pressure valve in the outlet leading to the preheater restricting the supply of steam thereto without materially reducing the pressure of the steam.

9. Apparatus for heating and deaerating water comprising in combination a deaerating chamber providing an upper vapor space and a lower water storage space, a preheater comprising a vapor space separate from the first mentioned vapor space, means for passing the water to be treated into the preheater, a connection through which the water passes from the preheater into the vapor space in said chamber, means for discharging steam and liberated air from the vapor space of said chamber, the last mentioned means including a vent condenser for condensing the steam discharged, an evaporator in said water storage space having greater capacity than said vent condenser, under normal operating conditions, for condensing steam supplied thereto, and steam supply and distributing means supplying steam at the rate required to maintain the water in said storage space at a suitable final delivery temperature, and including means for supplying to the evaporator all of the steam supplied which the latter is capable of condensing and for passing the uncondensed residue of the steam supplied to the vapor space of the preheater.

10. Apparatus for heating and deaerating water comprising in combination a deaerating chamber providing an upper vapor space and a lower water storage space, a preheater comprising a heating steam space separate from the first mentioned vapor space, means for passing the water to be treated into the preheater, a connection through which the water passes from the preheater into the vapor space in said chamber, means for discharging steam and liberated air from the vapor space of said chamber, an evaporator in said water storage space having a steam inlet and an outlet for uncondensed steam, means supplying steam to said evaporator inlet at the rate required to maintain the water in said storage space at a desirable final delivery temperature, and means for passing the steam not condensed in the evaporator from the steam outlet of the latter to the steam space of the preheater.

MATTHIAS STEPHEN GEREND.